(12) United States Patent
van Buul et al.

(10) Patent No.: US 12,530,452 B2
(45) Date of Patent: Jan. 20, 2026

(54) GENERALIZED DATAFLOW ANALYSIS FOR STATIC APPLICATION SECURITY TESTING

(71) Applicant: MICRO FOCUS LLC, Santa Clara, CA (US)

(72) Inventors: Franciscus Henricus Arnoldus van Buul, Montfoort (NL); Caleb Andrew Voss, Doraville, GA (US); Trang Indie To, Santa Clara, CA (US)

(73) Assignee: Micro Focus LLC, Santa Clara, CA (US)

( * ) Notice: Subject to any disclaimer, the term of this patent is extended or adjusted under 35 U.S.C. 154(b) by 232 days.

(21) Appl. No.: 18/239,011

(22) Filed: Aug. 28, 2023

(65) Prior Publication Data

US 2025/0077666 A1    Mar. 6, 2025

(51) Int. Cl.
| | |
|---|---|
| G06F 21/00 | (2013.01) |
| G06F 8/41 | (2018.01) |
| G06F 21/56 | (2013.01) |
| G06F 21/57 | (2013.01) |

(52) U.S. Cl.
CPC ............ G06F 21/563 (2013.01); G06F 8/433 (2013.01); G06F 21/577 (2013.01)

(58) Field of Classification Search
CPC ....... G06F 21/577; G06F 8/433; G06F 21/563
USPC .......................................................... 726/25
See application file for complete search history.

(56) References Cited

U.S. PATENT DOCUMENTS

| | | | |
|---|---|---|---|
| 6,370,685 B1* | 4/2002 | Robison ................. | G06F 8/433 |
| | | | 717/155 |
| 7,150,008 B2 | 12/2006 | Cwalina et al. | |
| 9,832,068 B2* | 11/2017 | McSherry ............. | G06F 9/4494 |
| 11,106,440 B2* | 8/2021 | Beit-Aharon ............ | G06F 8/51 |
| 11,216,256 B2 | 1/2022 | Smiljanic et al. | |
| 12,373,558 B1* | 7/2025 | Long ..................... | G06F 21/563 |
| 2006/0236311 A1* | 10/2006 | Chang ................. | G06F 11/3608 |
| | | | 717/151 |
| 2014/0369596 A1* | 12/2014 | Siskind .................. | G06V 10/85 |
| | | | 382/158 |
| 2017/0212829 A1 | 7/2017 | Bales et al. | |
| 2021/0073107 A1* | 3/2021 | Sharma ................. | G06F 21/577 |
| 2024/0126630 A1* | 4/2024 | Nagar ................. | G06F 11/3024 |
| 2025/0004909 A1* | 1/2025 | Pan ..................... | G06F 11/3684 |

FOREIGN PATENT DOCUMENTS

| | | |
|---|---|---|
| CN | 110727598 A | 1/2020 |
| CN | 113254945 A | 6/2021 |

* cited by examiner

*Primary Examiner* — Josnel Jeudy
(74) *Attorney, Agent, or Firm* — Sheridan Ross P.C.

(57) ABSTRACT

A superlattice corresponding to static application security testing (SAST) of source code specifies lattices respectively corresponding to static analyses performable on the source code. Each lattice is specified by all possible lattice elements of the lattice and an operator indicating how two lattice elements of the lattice are combined during the static analysis to which the lattice corresponds. A lattice product of the lattices specified by the superlattice is generated based on all the possible lattice elements of each lattice and the operator of each lattice indicating how two lattice elements are combined. Generalized dataflow analysis executable code is executed on the source code, using the lattice product, to perform the SAST of the source code, including the static analyses respectively corresponding to the lattices.

20 Claims, 7 Drawing Sheets

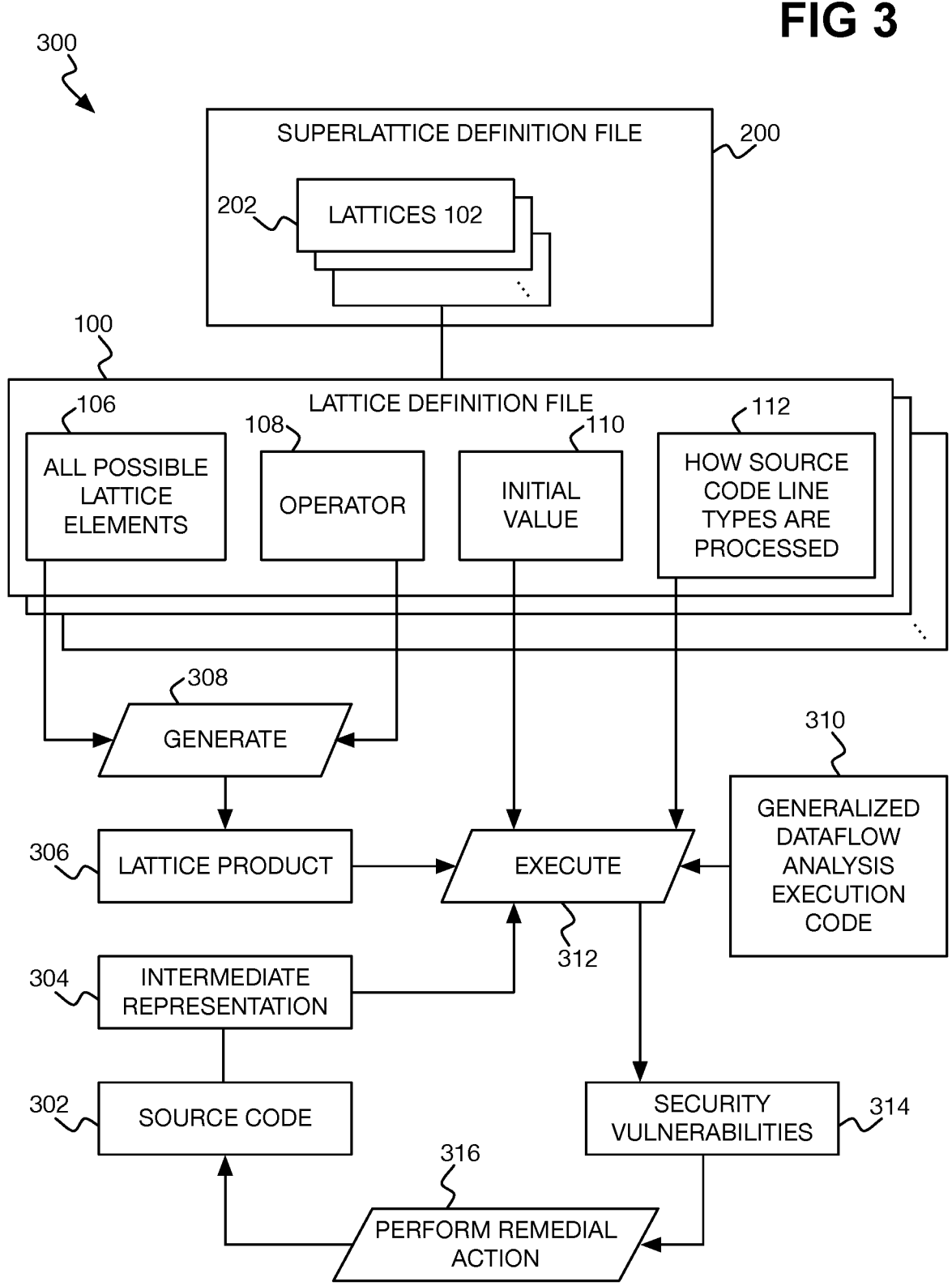

GENERALIZED DATAFLOW ANALYSIS FOR STATIC APPLICATION SECURITY TESTING

BACKGROUND

Computing devices like desktops, laptops, and other types of computers, as well as mobile computing devices like smartphones, among other types of computing devices, run software, which can be referred to as applications, to perform intended functionality. An application may be a so-called native application that runs on a computing device directly, or may be a web application or "app" at least partially run on a remote computing device accessible over a network, such as via a web browser running on a local computing device. An application can be tested, or analyzed, in a variety of different ways to ensure that the application correctly performs its intended functionality as well as to ensure that the application does not have any potential security vulnerabilities.

BRIEF DESCRIPTION OF THE DRAWINGS

FIG. 3 is a diagram of an example process by which static application security testing (SAST) of source code is performed by specifying a superlattice of the lattices for corresponding static analyses, such that the SAST is performed by executing generalized dataflow analysis execution code that is not specific to which lattices are specified by the superlattice.

DETAILED DESCRIPTION

Figure 1A:
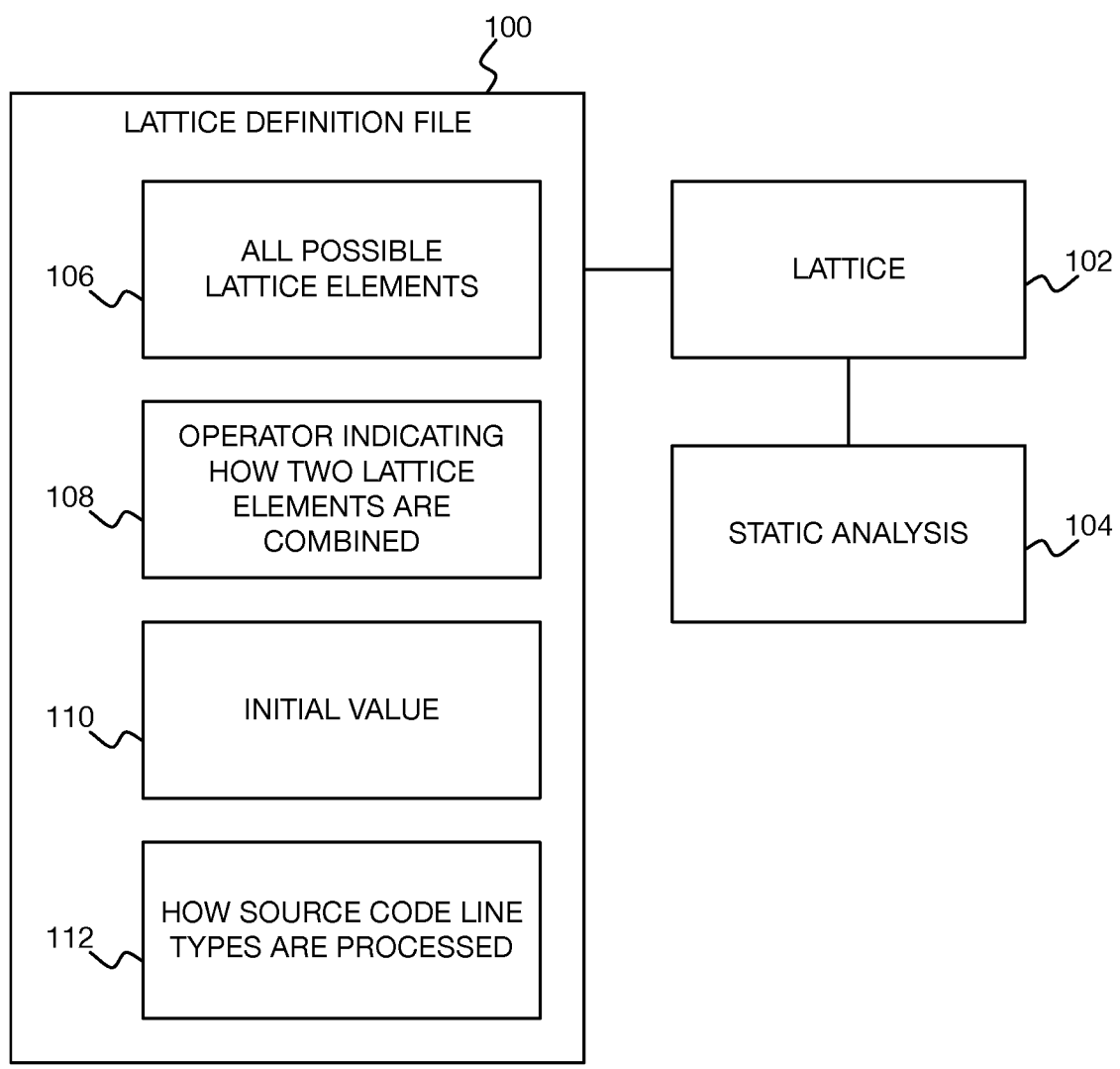
FIG. 1A is a diagram of an example lattice definition file specifying a lattice for a corresponding static analysis that can be performed on source code for an application.

As noted in the background, an application can be tested to ensure that it performs its intended functionality as well as to ensure that it does not have any potential security vulnerabilities. One type of application testing that is performed particularly to identify potential security vulnerabilities is known as static application security testing (SAST). SAST involves analyzing the source code of an application to determine whether, upon generation of executable code from the source code, subsequent execution of the application will have potential security vulnerabilities. SAST is static in that the application is not actually executed (i.e., executable code for the application is not generated from the source code and/or is not executed) to identify security vulnerabilities. In other words, SAST utilizes only the source code of an application and does not consider the application when it is actually running.

Other, non-SAST techniques include, among others, dynamic application security testing (DAST) and interactive application security testing (IAST). DAST identifies security vulnerabilities within an application as the application is running (i.e., during execution of the executable code for the application), such as in a production environment in which the application is being used by end users. Unlike SAST, DAST utilizes only the executable code of the application and considers the application when it is actually running. IAST identifies security vulnerabilities within an application during automated or human-assisted testing of the application while the application is running, and can potentially identify the source code responsible for identified security vulnerabilities. Unlike SAST and like DAST, IAST utilizes the executable code of the application and considers the application when it is actually running, but unlike DAST can reference the source code of the application.

When using SAST in particular, there are different types of security vulnerabilities for which application source code can be tested. Stated differently, there are different types of security-oriented static analyses of source code that can be performed via SAST. One type of security-oriented static analysis that can be performed via SAST is known as taint analysis. Taint analysis identifies where potentially harmful data may be introduced into an application, which are known as taint sources, and where the potentially harmful data of such taint sources may cause harm, which are known as taint sinks, when the application is executed. For example, a line of source code that reads a password may be considered a taint source, and output of that password to a console or log file in cleartext may be considered a taint sink.

Another type of security-oriented static analysis that can be performed via SAST is buffer analysis. Buffer analysis identifies locations within source code at which potential buffer overflow and underflow flow conditions may occur during subsequent execution of the application. A third type of security-oriented static analysis that can be performed via SAST is control flow analysis. Control flow analysis treats an application as a generalized state machine, and identifies whether the state machine (i.e., the application) is likely to reach when an impermissible state, which may correspond to a security vulnerability, when the application is executed. As new security threats are identified, new security-oriented analyses can be introduced and performed via SAST.

SAST is a particular form of static analysis of source code, and there are static analyses of source code that are not SAST in that such analyses are not security oriented. Examples of such static analyses that are not security-oriented include constant propagation, type propagation and inference, and function pointer propagation. Constant propagation involves assessing the potential values of variables referenced in the source code of an application when the application is subsequently executed. Type propagation and inference involves identifying the data types that variables referenced in the source code may have when the application is subsequently executed. Function pointer propagation identifies potential targets of virtual function calls within the source code when the application is subsequently executed.

Security-oriented static analyses that are performed via SAST can have dependencies in relation to one another as well as to static analyses that are not security-oriented. For example, to determine whether access to a buffer may result in overflow, the possible values for both the index to the buffer and the length of the buffer have to be tracked. These values in turn may be obtained via constant propagation. Therefore, buffer analysis can be said in this respect to be dependent on constant propagation, in that constant propagation monitors the potential values, and the buffer analysis identifies whether the values result in buffer overflow.

Existing approaches for SAST of the source code of applications are highly customized and purpose-built. That is, a given SAST solution or tool (e.g., executable code that receives source code as input and identifies security vulnerabilities within the source code as output) is typically developed to perform a specified type of security-oriented analysis, or specified types of security-oriented analyses. If a new type of security vulnerability is identified for which source code is to be tested, in some cases either an entirely new SAST solution may have to be developed, or an existing SAST solution may have to be modified, reworked, or redeveloped to test for the new type of security vulnerability.

For example, a SAST solution that is geared towards taint analysis may intrinsically perform constant propagation insofar as constant propagation is required to perform taint analysis. However, the constant propagation is not necessarily performed as an independent static analysis within the solution separate from the taint analysis, but is usually integrated within the taint analysis itself. Therefore, to update the SAST solution so that it also performs another type of security-oriented analysis, such as buffer analysis, the existing parts of the SAST solution as to constant propagation may not be easily reused or leveraged for the new parts that perform buffer analysis.

Moreover, adding a new type of security-oriented analysis to an existing SAST solution may introduce bugs in the security-oriented analysis that the SAST solution already performs. Furthermore, such development work regarding the SAST solution is performed by the developer of the SAST solution itself. That is, the customers of the SAST solution (e.g., developers of applications that utilize the SAST solution to perform SAST on the source code of their applications) are not themselves able to extend the SAST solution to perform additional types of security-oriented analysis. Ultimately, then, for each type of security-oriented analysis that a SAST solution is to provide, the analysis has to be hardcoded within the solution.

Techniques described herein alleviate these issues associated with SAST by leveraging the mathematical concept of a lattice so that the same generalized dataflow analysis executable code can be used regardless of the specific static analyses that are to be performed on source code of an application. For each type of static analysis, be it a security-oriented static analysis or a more fundamental static analysis like constant propagation, a corresponding lattice is specified. A user then just has to specify which static analyses are to be performed on given source code by specifying a superlattice of the lattices corresponding to these static analyses. The generalized dataflow analysis executable code is executed to evaluate the superlattice on the source code.

The generalized dataflow analysis executable code, in other words, is able to evaluate any type of lattice against source code, and therefore can be used regardless of lattice—and thus regardless of the static analysis to which the lattice corresponds. A novel insight recognized by the inventors is that since a superlattice of lattices is itself a lattice (namely, a lattice product of the lattices specified by this superlattice), this means that any combination of static analyses for which there are corresponding lattices can be evaluated by the same generalized dataflow analysis executable code. The generalized dataflow executable code therefore does not have to be modified for new types of static analyses or for different combinations of static analyses. To provide new static analyses, new lattices just have to be defined, and then specified in the superlattice.

FIG. 1A shows an example lattice definition file 100 for a lattice 102 that corresponds to a particular type of static analysis 104 that can be performed on application source code. The particular type of static analysis 104 to which the lattice 102 corresponds can be either a security-oriented static analysis or a non-security-oriented static analysis. A security-oriented static analysis can also be referred to as a security vulnerability detection analysis, and examples include taint analysis, buffer analysis, and control flow analysis, as described above. A non-security-oriented static analysis can be a propagation analysis, such as constant propagation analysis, type propagation and inference analysis, or function pointer propagation analysis, as also described above.

The lattice 102 is a relaxed version of this terminology as mathematically understood. That is, the lattice 102 corresponding to a static analysis 104 is a relaxed version of the mathematical structure that is considered a lattice, and the technical term thereof is a semilattice. Mathematically, a lattice is a partially ordered set in which every pair of elements has a unique supremum (i.e., least upper bound or join) and a unique infimum (i.e., a greatest lower bound or meet). "Join" and "meet" can be the names of the two lattice operators. The relaxed version of the lattice 102 used herein is either a partially ordered set in which every pair of elements has a unique infimum (i.e., a greatest lower bound or meet), or a partially ordered set in which every pair of elements has a unique supremum (i.e., a least upper bound or join). In other words, just one of the two lattice operators is needed. Such a sole operator may be referred to as "the lattice operator", instead of specifically as the meet operator or the join operator.

The lattice definition file 100 can be a text file, and may be considered a plugin file in that for each type of static analysis 104 that is to be performed, there is a corresponding lattice definition file 100. The lattice definition file 100 can be or specify source code, such as Java source code, and is compiled to generate a Java object corresponding to the lattice 102. The lattice definition file 100 defines a given type of static analysis 104 in particular by defining the lattice 102 corresponding to that static analysis 104. The lattice definition file 100 defines the lattice 102 by specifying all possible lattice elements 106 of the lattice 102 for the static analysis 104 in question, as well as the lattice operator 108 indicating how any two of the lattice elements 106 are combined (where such a combination is itself a lattice element).

For example, in the case in which the static analysis 104 is taint analysis, there can be different types of taint that are to be tracked: taint resulting from a password; taint resulting from a structured query language (SQL) statement; taint resulting from an incoming web call; and so on. Each of these types of taint has an associated taint flag, such as PASSWORD, SQL, and WEB. The possible lattice elements 106 that define the corresponding lattice 102 for taint analysis are all possible sets of these flags, including the case in which there is no flag: the empty set { }; {PASSWORD}; {SQL}; {WEB}; {PASSWORD, SQL}; {PASSWORD, WEB}; {SQL, WEB}; and {PASSWORD, SQL, WEB}. In general, for n flags that are being tracked in the static analysis 104, there are 2^n possible lattice elements for the corresponding lattice 102.

As noted above, the lattice 102 defined by the lattice definition file 100 is specified not just by all the possible lattice elements 106 of that lattice 102, but also by the lattice operator 108 that indicates how any two lattice elements 106 are combined. For any given type of static analysis 104, the lattice operator 108 for the corresponding lattice 102 is one of two types of lattice operators: a lattice join operator ("∨") or a lattice meet operator ("∧"). The lattice operator 108 is specified as either the join operator or the meet operator depending on the particular static analysis 104 to which the lattice 102 corresponds.

For instance, in the case of taint analysis, the lattice operator 108 is the set union operator ("∪"). This means that in the example in which the lattice element {PASSWORD} is combined with the lattice element {SQL, WEB}, the result is {PASSWORD, SQL, WEB}. As another example, {SQL}∪{WEB}={SQL, WEB}. The lattice operator 108 is the set union operator for taint analysis because every potential type of taint is to be tracked. This is because if one line of source code for a variable results in taint due to a SQL statement (e.g., {SQL}) and another line of source code for the variable results in taint due to an incoming web call (e.g., {WEB}), then there is taint for that variable from both a SQL statement and an incoming web call (e.g., {SQL, WEB}).

Because the lattice 102 for a particular type of static analysis 104 is evaluated for application source code, the lattice definition file 100 also specifies the initial value 110 to be used as the lattice element for every variable introduced in the source code during evaluation. The initial value 110 is one of all the possible lattice elements 106 that have been defined for the lattice 102. More specifically, there is a mathematical requirement that the initial value 110 is the value z such that, for all x, the join (or meet, if appropriate) of x and z is x. For example, in a lattice of sets where the lattice operator 108 is set union, the empty set, { }, fulfills the requirement on the initial value 110. In the case of taint analysis, for instance, until taint is identified for a variable the variable is assumed to not have any taint. Therefore, the initial value 110 of the lattice element for every variable is the empty set, { }.

Similarly, the lattice definition file 100 specifies how each source code line type is to be processed when evaluating the lattice 102 against source code, which is depicted in FIG. 1A by reference number 112. For example, one type of source code line may be a function call. In the case of taint analysis, if the function call is a password-oriented function call, then the lattice element 106 associated with password taint, {PASSWORD}, is specified to be combined with the current lattice element for the variable in question, using the lattice operator 108 for taint analysis, which is the set union operator as noted above.

As another example, another type of source code line may be a simple constant assignment, where a variable is set to a constant. In the case of taint analysis, for this type of source code line, the lattice element 106 associated with the empty set, { }, may be specified to be combined with the current lattice element for the variable in question, using the lattice operator.

As a concrete example, consider the following five lines of pseudo source code:

```
1. IF RANDOMNUMBER( ) < 5 THEN
2.     X=READPASSWORD( )
3. ELSE
4.     X="HELLO WORLD"
5. END IF
```

There is one variable, X, in this pseudo source code. Therefore, at evaluation of the lattice 102 for this source code, a lattice element for the variable X is initially set to the empty set { }.

There are two lines of source code associated with the variable X, lines 2 and 4. Line 2 sets the variable to the value returned by calling a function that is known to return a sensitive password. Therefore, processing of this source code line during evaluation of the lattice 102 results in the current lattice element for the variable X to be replaced by the lattice element {PASSWORD}. Line 4 sets the variable to a constant, specifically the string "HELLO WORLD". Therefore, processing of this source code line results in the current lattice element for the variable X to be replaced by the lattice element { }.

It is noted that in this example, whether line 2 is executed or whether line 4 is executed depends on whether or not the call to the function "RANDOMNUMBER( )" in line 1 returns a value less than 5. Since SAST statically considers the source code of an application and does not dynamically consider actual execution of the source code, evaluation of the lattice 102 corresponding to taint analysis takes into account every possible execution path through the source code. At the end of line 5, the lattice element for the variable X in one case will be {PASSWORD} when line 2 is considered, and in another case will be { } when line 4 is considered. The lattice elements for these two cases are combined via the specified operator 108 to result in the overall lattice element for the variable X at the end of line 5, which is {PASSWORD}∪{ }={PASSWORD}.

The lattice definition file 100 for the lattice 102 corresponding to the case in which the static analysis 104 is particularly taint analysis has been described. As noted above, other types of security-oriented static analyses 104 include buffer analysis and control flow analysis.

Buffer analysis identifies whether buffers delineated in the source code have buffer overflow or underflow vulnerabilities. A part of this analysis is determining the allocation sizes of buffers. The lattice definition file 100 for the lattice 102 corresponding to this type of static analysis 104 may specify, as all the possible lattice elements 106, a half-open integer interval [a, b) representing possible buffer lengths. The notation [a, b) uses a pair of integers, a and b, to denote the set of all integers x satisfying a<=x<b. Examples of such lattice elements 106 include the empty interval [0, 0); intervals containing a single possible length, such as [10, 11) or [256, 257); and intervals containing a range of possible lengths, such as [10, 20).

The operator 108 indicating how any two of the lattice elements 106 are combined for the lattice 102 corresponding to buffer static analysis 104 may be the operator circ, defined as [a1, b1) circ [a2, b2)=[min(a1, a2), max(b1, b2)). The initial value 110 to be used as the lattice element for every buffer introduced in the source code during evaluation may be specified as the empty interval lattice element 106.

As to how each source code line type is processed for buffer analysis, for each type of source code line that allocates a buffer, the lattice element associated to that buffer is the singleton set {N}, where N is the integer that gives the allocation size. Where a buffer may originate from one of multiple allocation sites, the lattice operator is used to combine the associated lattice elements. For example, if one possible allocation site for a buffer yields the element {10}, while a second possible allocation site yields the element {256}, the buffer is ultimately associated to the element {10, 256}.

Next, control flow analysis identifies whether source code reaches an impermissible state. For example, the analysis may be interested in determining if a buffer may be incorrectly freed twice. The lattice definition file 100 for the lattice 102 corresponding to this type of static analysis 104 may specify, as all the possible lattice elements 106, all the subsets of the set {ALLOCATED, FREED, FAIL}.

The operator 108 indicating how any two of the lattice elements 106 are combined for the lattice 102 may be the set union operator, as with the lattice 102 corresponding to taint static analysis. As to how each source code line type is processed for control flow analysis, every source code line which allocates a buffer, x=allocate( ), is considered to place the buffer x into the ALLOCATED state, and so the lattice element associated to x is the element {ALLOCATED}. Moreover, every source code line which frees a buffer, free(x), is considered to place an ALLOCATED buffer x into the FREED state, but a FREED buffer into the FAIL state; so if the lattice element currently associated to x is {ALLOCATED}, the element is updated to {FREED}; if it is {FREED} it is updated to {FAIL}; if it is {ALLOCATED, FREED} it is updated to {FREED, FAIL}; and so on. As described above for taint static analysis, where there are multiple possible execution paths for the program, the analysis applies the lattice operator to combine the lattice elements from multiple paths.

As noted above, in addition to security-oriented static analyses 104, other static analyses 104 can be unrelated to security per se. For example, constant propagation static analysis 104 determines (i.e., tracks) the potential values of variables delineated in source code of an application. The lattice definition file 100 for the corresponding lattice 102 specifies, as all the possible lattice elements 106, every combination of every value a variable of a given type can have.

For example, a variable of eight-bit signed integer type can have any integer value between −128 and 127. The lattice definition file 100 specifies, as all the possible lattice elements 106, every combination of these values. For variables that are eight bits (and even sixteen bits or thirty-two bits) in length, the number of combinations may be tractable. That is, the number of possible lattice elements 106 is $2^n$, where n is the number of bits, and tracking this number of potential elements during evaluation of the lattice 102 may be tractable considering the amount of memory and processing capability of the computing device performing the evaluation.

Once the number of bits a variable of a particular type can have as its length exceeds some number, as well as for variables of types such as strings that may not have an upper bound in length, tracking the number of potential elements during evaluation of the lattice 102 becomes intractable. In such instances, the possible lattice elements 106 may be specified as all combinations of no more than a specified number of values of the variable. All combinations of more than the specified number of values are symbolically specified as the same lattice element 106 in this case.

As a concrete example, a variable of a particular type may be able to have one of five possible values a, b, c, d, and e. Therefore, the possible lattice elements 106 should include the empty set { }; five sets that each include one of these values, specifically {a}, {b}, {c}, {d}, and {e}; all the sets that each include any two of the values, such as {a, b}, {a, c}, {b, d}, and so on; all the sets that each include any three of the values, such as {a, b, c}; {b, d, e}, and so on; all the sets that each include any four of the values, such as {a, b, c, d}, and so on; and all the sets that each include any five of the values, such as {a, b, c, d, e}, and so on.

However, rather than individually specifying every set including four or five of the values within the possible lattice elements 106, any set including four or five of the values may be symbolically represented as the same lattice element 106, such as TOP. Therefore, instead of there being a lattice element 106 {a, b, c, d}, a lattice element 106 {a, b, c, e}, a lattice element 106 {b, c, d, e}, and so on, there is a single lattice element 106 TOP.

The lattice definition file 100 for the constant propagation static analysis 104 may specify the lattice operator as the operator 108 indicating how two lattice elements 106 are combined. Note what this means in the example in which a variable of a particular type can have one of five possible values a, b, c, d, and e, and in which sets including four or five of the values are symbolically represented by the same lattice element 106 TOP. Specifically, the combination of {a, b, c} and {d} will result in TOP, since {a, b, c, d} is not separately represented as a possible lattice element 106. Similarly, the combination of {b, c} and {d, e} will result in TOP, since {b, c, d, e} is not separately represented as a possible lattice element 106.

The lattice definition file 100 for the constant propagation static analysis 104 may specify the empty set { } as the initial value 110 for a variable of a given type. As to how each source code line type is processed for constant propagation static analysis 104, for each type of source code line that changes a variable, the lattice definition file 100 specifies the lattice element that should be combined with the current lattice element for the variable (where the lattice element that should be combined can itself be the lattice element of another variable).

For example, for the source code line x=5 (or, more generally, any constant value), the current lattice element for the variable x replaced by the lattice element {5}(or, more generally, the set including just the constant value in question). For the source code line x=x+5, the current lattice element for the variable x is replaced by the lattice element that includes the pair-wise sum of the integers in the lattice element for the for the variable x and 5. For the source code line x=y+5, the current lattice element for the variable x is replaced by the pair-wise sum of the integers in the lattice elements for the variable y and the set {5}.

Another type of static analysis 104 that is not security-oriented is type propagation and inference static analysis, which may also be referred to as simply type propagation static analysis. Such static analysis 104 determines (i.e., tracks) the potential type a variable delineated in source code of an application may be. The lattice definition file 100 corresponding to this static analysis 104 specifies as all the possible lattice elements 106 every combination of every type a variable may have, such as FLOATING, INTEGER, UNSIGNED INTEGER, and so on, in the case of numerically oriented variables. The operator 108 indicating how any two such lattice elements 106 are combined may be the meet operator, and the initial value 110 for such a variable may be the empty set.

As to how each source code line is processed, for each type of source code line that changes a variable, the lattice definition file 100 specifies the lattice element that should be combined with the current lattice element for the variable. For example, for the source code line x=5, since 5 can be represented in floating point notation, integer notation, or unsigned integer notation, the current lattice element for the variable x is combined by the meet operator with the lattice element {FLOATING, INTEGER, UNSIGNED INTEGER}. For the source code line x=−6, since −6 can be represented in floating point notation or integer notation but not in unsigned integer notation, the current lattice element is combined with the lattice element {FLOATING, INTEGER}. For the source code line x=3.14, since 3.14 can only be represented in floating point notation, the current lattice element is combined with the lattice element {FLOATING}.

Another type of static analysis 104 that is not security-oriented is function pointer analysis, which determines (i.e., tracks) potential targets of virtual function calls delineated in the source code. The lattice definition file 100 corresponding to this static analysis 104 specifies as all the possible lattice elements 106 every possible subset of functions in the application. The operator 108 indicating how any two such lattice elements 106 are combined may be the set union operator, and the initial value 110 for such a virtual function call may be the empty set. As to how each source code line is processed, for each type of source code line that obtains a pointer to a function, foo( ), the lattice definition file 100 specifies that the lattice element associated to that function pointer is the singleton set {foo}.

Like other types of data, function pointers may flow through an application across multiple different paths of execution, resulting in variables which can possibly point to multiple different functions. The lattice operator 108 is used to combine lattice elements from multiple paths. For example, if a variable f may point to foo( ) on one path and may point to bar( ) on another path, the analysis ultimately associates the lattice element {foo, bar} to the variable f, since that set is the union of the sets {foo} and {bar} obtained from each path.

As has been described, for each different type of static analysis 104, there is a lattice definition file 100 that defines the lattice 102 for that static analysis 104. The lattice definition file 100 specifies all possible lattice elements 106 of that lattice 102, and the operator indicating how any two lattice elements 106 are combined. The lattice definition file 100 further specifies the initial value 110 that a variable delineated in source code should have when the source code is evaluation (i.e., one of the lattice elements 106), and how each different source code line type is processed with respect to the current lattice element for a variable. Therefore, there are multiple lattice definition files 100 for the different static analyses 104 that can be performed.

Figure 1B:
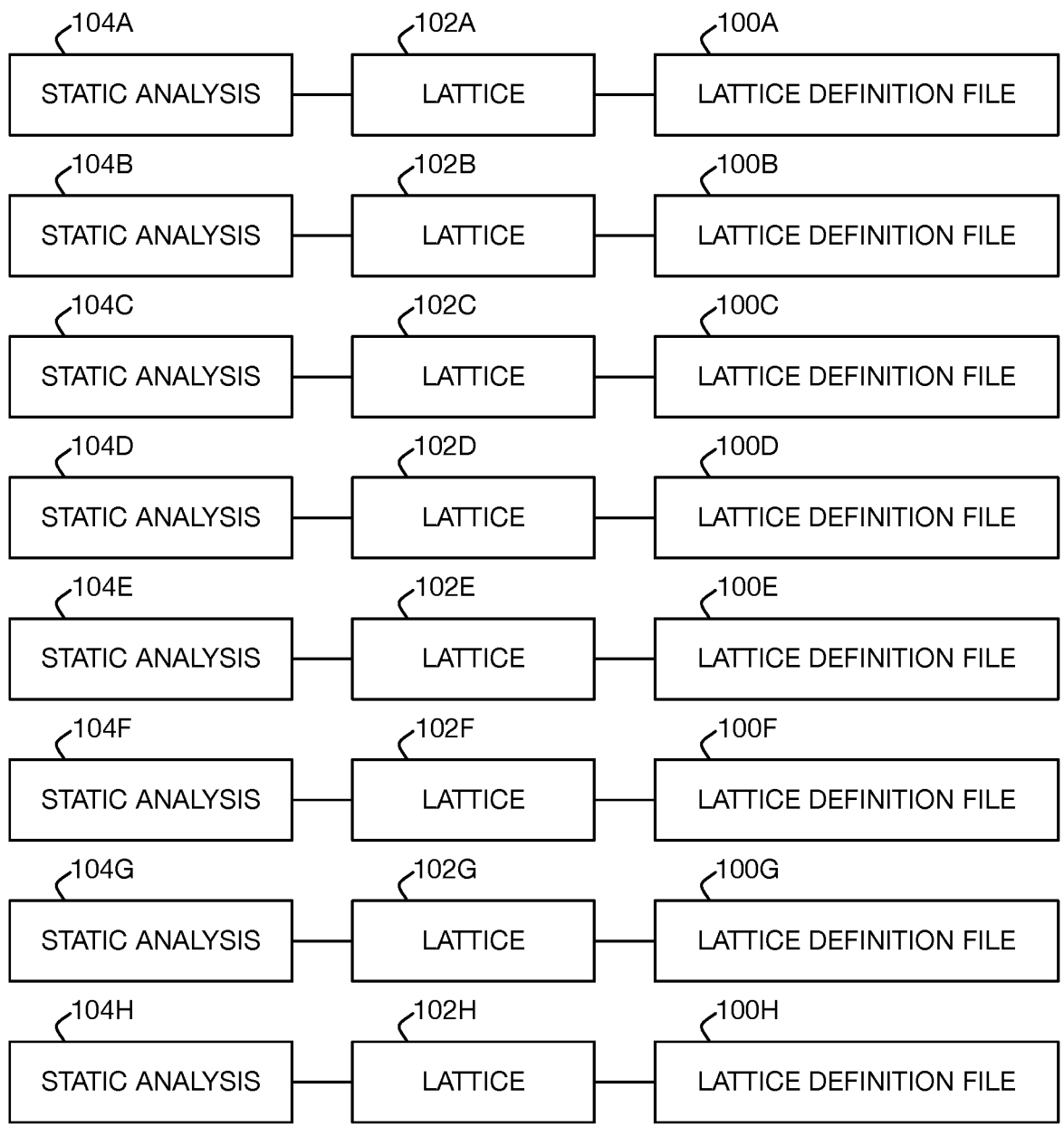
FIG. 1B is a diagram of an example that for multiple different types of static analyses that can be performed on source code, there are lattice definition files that respectively specify corresponding lattices.

FIG. 1B shows an example in this respect. There are eight lattice definition files 100A, 100B, 100C, 100D, 100E, 100F, 100G, and 100H that define lattices 102A, 102B, 102C, 102D, 102E, 102F, 102G, and 102H for static analyses 104A, 104B, 104C, 104D, 104E, 104F, 104G, and 104H, respectively. The lattice definition files 100A, 100B, 100C, 100D, 100E, 100F, 100G, 100H can be collectively referred to as the lattice definition files 100. The lattices 102A, 102B, 102C, 102D, 102E, 102F, 102G, and 102H can be collectively referred to as the lattices 102. The static analyses 104A, 104B, 104C, 104D, 104E, 104F, 104G, and 104H can be collectively referred to as the static analyses 104. FIG. 1B illustratively depicts, therefore, that there are multiple lattice files 100 that are each for a lattice 102 corresponding to a different static analysis 104.

Figure 2A:
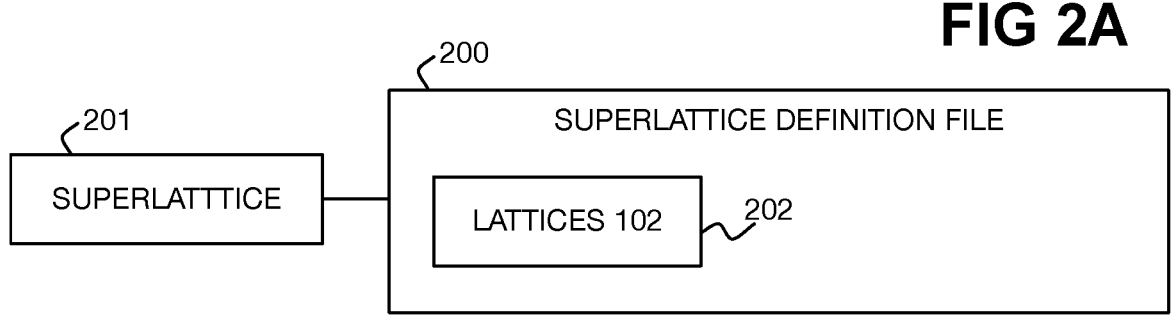
FIG. 2A is a diagram of an example superlattice definition file specifying a superlattice of a particular group of lattices for corresponding static analyses that are to be performed on source code for an application.

FIG. 2A shows an example superlattice definition file 200 for a superlattice 201 corresponding to particular SAST that can be performed on application source code. The SAST specifically specifies which static analyses 104 are to be performed. Stated another way, a given SAST is a collection of static analyses 104 that are to be performed. Therefore, the superlattice 201, as defined by its superlattice definition file 200, specifies a group 202 of lattices 102 corresponding to these static analyses 104. Like the lattice definition file 100, the superlattice definition file 200 may be a text file. The superlattice definition file 200 thus may also be or specify source code, such as Java source code, that is compiled to generate a Java object corresponding to the superlattice 201.

A given superlattice 201, and thus the superlattice definition file 200 for the superlattice 201, can specify any combination of lattices 102 as the group 202, depending on which static analyses 104 are to be performed as the SAST. As lattices 102 corresponding to new static analyses 104 are specified via new lattice definition files 100, the superlattice definition file 200 for an existing superlattice 201 can be updated to also specify such lattices 102 so that their corresponding static analyses 104 are performed as part of the SAST.

Figure 2B:
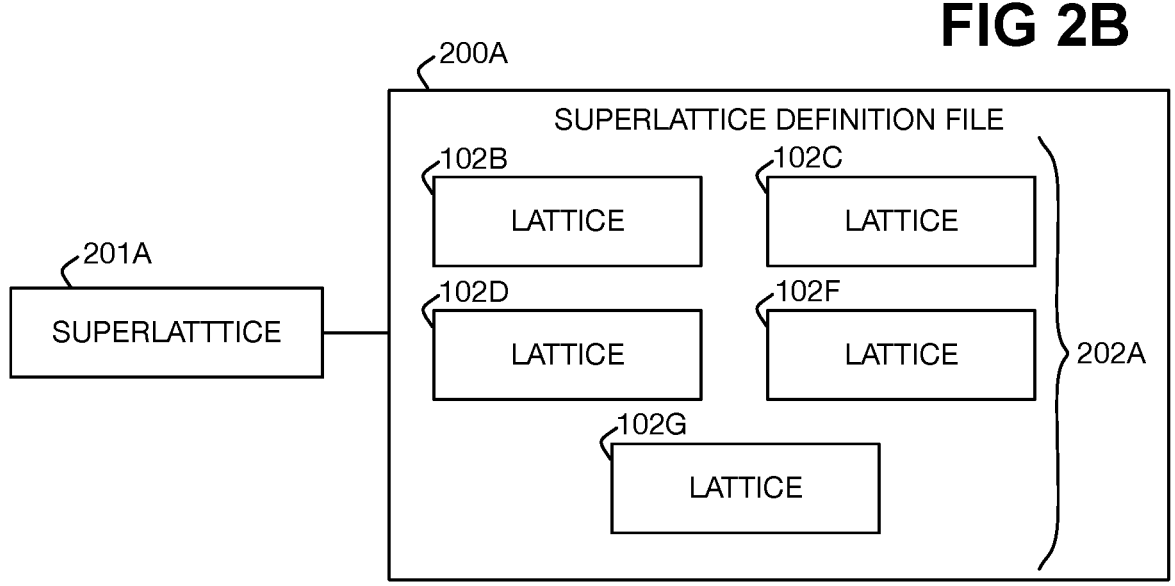
FIGS. 2B and 2C are diagrams of particular examples of superlattice definition files corresponding to different superlattices that specify different groups of lattices for corresponding static analyses that are to be performed on source code for an application.
Figure 2C:
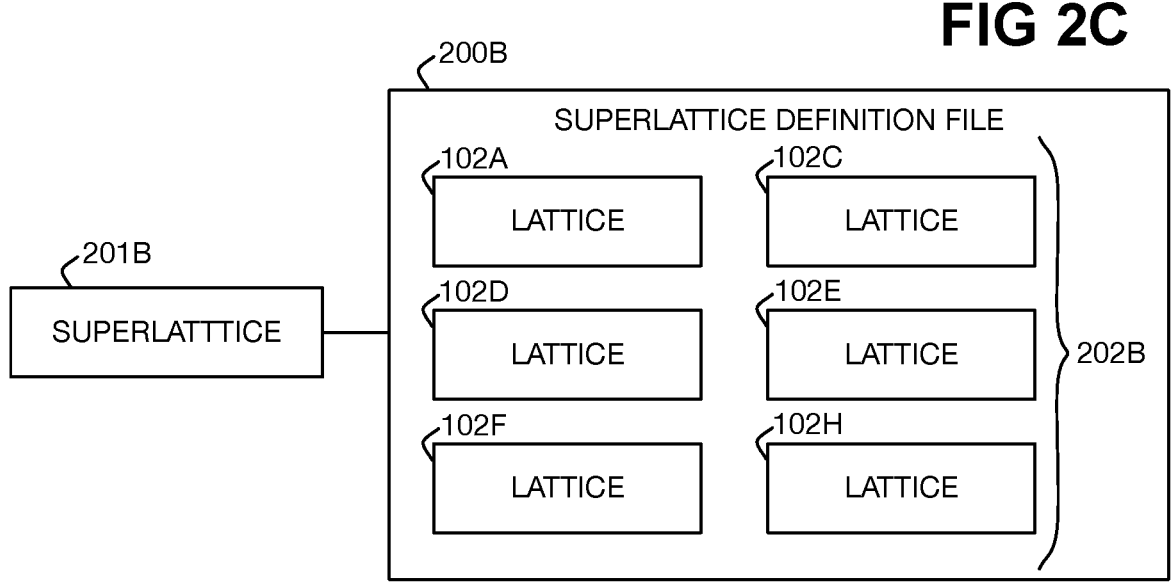

FIGS. 2B and 2C respectively show particular examples of superlattice definition files 200A and 200B, which can be collectively referred to as the superlattice definition files 200. The superlattice definition file 200A is for a superlattice 201A that specifies a lattice group 202A, and the superlattice definition file 200B is for a superlattice 201B that specifies a lattice group 202B. The superlattices 201A and 201B can be collectively referred to as the superlattices 201, and the lattice groups 202A and 202B can be collectively referred to as the lattice groups 202.

The lattice group 202A specified by the superlattice 201A particularly includes the lattices 102B, 102C, 102D, 102F, and 102G. This means that the SAST corresponding to the superlattice 201A entails performance of the static analyses 104B, 104C, 104D, 104F, and 104G that respectively correspond to the lattices 102B, 102C, 102D, 102F, and 102G. The lattice group 202B specified by the superlattice 201B particularly includes the lattices 102A, 102C, 102D, 102E, 102F, and 102H. This means that the SAST corresponding to the superlattice 201B entails performance of the static analyses 104A, 104C, 104D, 104E, 104F, and 104F that respectively correspond to the lattices 102A, 102C, 102D, 102E, 102F, and 102H.

FIGS. 2B and 2C illustratively depict, therefore, that different superlattices 201 can specify different lattice groups 202, where each lattice group 202 specifies a different combination of all available lattices 102. As noted above, a superlattice 201 can via its corresponding superlattice definition file 200 be updated to specify additional lattices 102 within its lattice group 202 as new lattices 102 are created for new static analyses 104.

Furthermore, a superlattice 201 references the lattices 102 included in its lattice group 202 but does not define the lattices 102. Rather, the lattices 102 are defined by their respective lattice definition files 100. This means that if the definition of a lattice 102 specified by a lattice group 202 of a given superlattice 201 is updated or changed within its lattice definition file 100, the superlattice definition file 200 for this superlattice 201 does not have to be updated.

Lattices 102 for static analyses 104 as defined by lattice definition files 100, and superlattices 201 for SAST that specify lattice groups 202 as defined by superlattice definition files 200, are not specific to application source code, and thus are source code independent. That is, once lattices 102 have been defined, and once superlattices 201 of groups 202 of these lattices 102 have been defined, SAST corresponding to the superlattices 201 can be performed on any application source code via performance of the static analyses 104 corresponding to the lattices 102 specified by the superlattices 201. Stated another way, lattice definition files 100 and superlattice definition files 200 do not have to be created on a per-application basis.

FIG. 3 shows an example process 300 by which SAST corresponding to a superlattice definition file 200 is performed on application source code 302. Each lattice 102 of the lattice group 202 specified by the superlattice definition file 200 has a corresponding lattice definition file 100. The lattice definition file 100 for each lattice 102 specifies all possible lattice elements 106 of that lattice 102, and the operator 108 by which two such lattice elements 106 are combined, as has been described. The lattice definition file 100 for each lattice 102 further specifies which lattice element 106 is to be used as the initial value 110 for every variable delineated in the source code 302, and how source code line types are to be processed during evaluation of the source code 302, as has also been described.

The process 300 includes generating (308) a lattice product 306 of the lattices 102 specified by the superlattice definition file 200 for the SAST to be performed on the source code 302. The terminology "lattice product" can also be referred to as "product lattice." The lattice product 306 is particularly generated based on the possible lattice elements 106 of each lattice 102 and the specified operator 108 used to combine any two lattice elements 106 of each lattice 102. The lattice product 306 is itself a lattice having lattice elements.

The lattice elements of the lattice product 306 are all the k-tuples, where k is the number of lattices 102 specified by the superlattice definition file 200, such that the nth component of the k-tuple is a lattice element 106 of the nth lattice 102 specified by the superlattice definition file 200. The lattice operator 208 of the lattice product 306 is given by the component-wise application of the lattice operators 208 of each lattice 102 specific by the superlattice definition file 200. Moreover, the initial lattice element 110 of the lattice product 306 is given by the k-tuple consisting of the initial lattice elements of each of the lattices 102 specified by the superlattice definition file 200.

As a concrete example, the superlattice definition file 200 may specify lattices 102A, 102B, and 102C, which may be denoted as lattices A, B, and C. The lattice product 306 in this case is A×B×C. The lattice product 306 will have elements <a, b, c>, where a is an element of lattice A, b is an element of lattice B, and c is an element of lattice C.

Furthermore, say there are two possible lattice elements 106 a1 and a2 for the lattice 102A; two possible lattice elements 106 b1 and b2 for the lattice 102B; and four possible lattice elements 106 c1, c2, c3, and c4 for the lattice 102C. The operators 108 for the lattices 102A, 102B, and 102C may be respectively expressed as $\otimes A$, $\otimes B$, and $\otimes C$, and may be the join operator ("$\vee$") or the meet operator ("$\wedge$") for any given lattice 102A, 102B, or 102C Let $\otimes ABC$ denote the lattice operator 108 of the lattice product 306.

The expression of the lattice operator 108 for the lattice product 306 of A, B, and C, which is written <a1, b1, c1>$\otimes ABC$<a2, b2, c2>, is defined as <a1 $\otimes A$ a2, b1 $\otimes B$ b2, c1 $\otimes C$ c2>. The superlattice 201 of a group 202 of lattices 102 can effectively be considered a lattice product 306 of these lattices 102. Moreover, the lattice product 306 is itself a lattice having lattice elements that are each a tuple of the possible lattice elements 106 of each of the lattices 102.

In general, in the process 300, the SAST corresponding to the superlattice 201 is performed on the source code 302 by evaluating the lattice product 306 of the lattices 102 specified by the superlattice 201 in relation to the source code 302. Such evaluation considers, for each lattice 102 of the lattice group 202, which lattice element 106 is specified as the initial value 110 for every variable delineated in the source code 302, as well as how different source code line types are to be processed as to the lattice elements 106.

Stated another way, performing any given SAST defined by any given superlattice definition file 200 simply involves evaluation of a lattice, specifically the lattice product 306. This means that any generalized lattice evaluation technique can be used, regardless of which static analyses 104 are to be performed as part of the SAST. In the example of FIG. 3, such a generalized lattice evaluation technique is represented as the generalized dataflow analysis execution code 310. The execution code 310 is thus executed (312) to evaluate the lattice product 306 on the source code 302 (such as an intermediate representation 304 thereof), taking into account the initial value 110 and how source code line types are processed for each lattice 102 included in the lattice product 306.

Because the generalized dataflow analysis execution code 310 can evaluate any lattice (i.e., any lattice product 306 of any group 202 of lattices 102), this means that the execution code 310 is not specific to any particular SAST nor any particular combination of static analyses 104. Therefore, different SAST corresponding to different groups of static analyses 104 can be performed using the same execution code 310 by simply specifying different superlattice definition files 200 for superlattices 201 corresponding to different groups 202 of lattices 102. Moreover, as new static analyses 104 are specified by defining new lattices 102 via corresponding lattice definition files 100, these new static analyses 104 can also be included in SAST that is performed, without having to change the execution code 310.

In the particular example process 300, the generalized dataflow analysis execution code 310 is executed (312) against an intermediate representation 304 of source code 302 for an application, as opposed to against the source code 302 itself. The usage of such an intermediate representation 304 permits the execution code 310 to be used regardless of source code type (i.e., different programming languages in which the source code are specified) insofar as different types of source code 302 are converted to the same type (i.e., the same format) of intermediate representation 304. Usage of an intermediate representation 304 of source code 302 further permits the specification of how source code line types are processed (as represented by reference number 112) in relation to the intermediate representation 304. This means that the same lattice definition files 100 can be used for different source code types, since source code 302 of different types are converted to the same type of intermediate representation 304.

The generalized dataflow analysis performed by the execution code 310 evaluates any lattice against the source code 302 (specifically against the intermediate representation 304 thereof) in general as follows. Every variable in the program is initially associated to the initial lattice value 110 of the lattice specified by the lattice definition 100. Every line of the source code 302 is processed 112 according to the lattice definition 100, which may involve updating the lattice element associated to some program variables using the lattice operator 108 of the lattice definition 100. The lines of the source code 302 are processed again, repeatedly, until no further changes can be made to the lattice elements associated to any program variables, or until some other termination condition is met, such as a timeout. Such repeated processing is referred to as iterating to a fixed point.

Because the superlattice definition file 200 corresponds to a particular SAST of source code 302 of an application, the output of operating the generalized dataflow analysis using the lattice product 306 given by the superlattice is the identification of potential security vulnerabilities 314 that may result if the application were actually executed (e.g., if the source code 302 were compiled to transform the source code 302 into executable code that is then executed).

As a concrete example, consider the follow three lines of pseudo source code 302:

1. X = 7
2. Y = 8
3. B = EQUAL(X, Y)

The superlattice 201 that is evaluated for this source code 302 can include a lattice 102 for integer constant propagation static analysis 104. Therefore, evaluation of the superlattice 201 results in tracking the values for the variables X, Y, and B in corresponding lattice elements during traversal of the source code 302, such that at the end of the analysis, the integer component of the lattice element for X is $\{7\}$, the integer component of the lattice element for Y is $\{8\}$, and the integer component of the lattice element for B is $\{\ \}$.

The superlattice 201 may further include a lattice 102 for Boolean constant propagation static analysis 104. Therefore, evaluation of the superlattice 201 results in a lattice element for B with Boolean component $\{false\}$, and lattice elements for X and Y with Boolean components $\{\ \}$. It is noted that evaluation of the lattice 102 for Boolean constant propagation static analysis 104 relies upon evaluation of the lattice 102 for the integer constant propagation static analysis 104, since identifying whether two variables may be the same integer requires tracking the possible integer values of each variable.

Ultimately, the end result of evaluation of the superlattice 201 results in a lattice element for X that is $<\{7\}, \{\ \}>$; a lattice element for Y that is $<\{8\}, \{\ \}>$; and a lattice element for B that is $<\{\ \}, \{false\}>$. The output of the security vulnerabilities 314 resulting from execution (312) of the generalized dataflow analysis execution code 310 can therefore include those statements delineated in the source code 302 involving variables for which the analysis produced an unsatisfactory lattice element.

The specific line numbers of the source code 302, or the lines of source code 302 themselves may be provided in the output. For example, if the source code 302 contains a statement that is a taint sink, and if the variable V passed to this sink is associated to an element of a product lattice such that the taint component of the element is a set containing the taint flag PASSWORD, then this sink statement and its location within the source code 302 may be reported as a security vulnerability 314.

Once the security vulnerabilities 314 have been identified, a remedial action may be performed (316) with respect to the source code 302 to resolve (or at least lessen the impact of) the vulnerabilities 314 within the source code 302. For example, the source code 302 of the application may be modified by a developer so that ultimate execution of the application will not result in the security vulnerabilities 314. As another example, for some types of security vulnerabilities 314, the source code 302 may be automatically modified to remove the vulnerabilities 314. Once the remedial action has been performed, the lattice product 306 may be evaluated against the source code 302 again to identify whether the security vulnerabilities 314 have been removed, or whether new vulnerabilities 314 have been introduced.

The process 300 therefore provides for improved execution of applications on computing devices, in that the process 300 ensures that the applications will have fewer (or no) security vulnerabilities 316. The inspection of source code 302 for security vulnerabilities 316 on the order that the process 300 can provide is largely intractable if it were performed manually by developers (or other users) themselves. The source code 302 for a modern application can have tens of thousands or more of lines of source code, and some types of security vulnerabilities 316 can escape detection by even the most knowledgeable and discerning person. The process 300 is thus not one that could be performed manually to any practicable degree.

This is underscored by security testing, such as SAST as well as DAST and SAST, being considered as a technology that is used by application developers to identify security vulnerabilities within source code so that the vulnerabilities can be removed. As has been noted, existing techniques for SAST in particular are specific to particular static analyses, and cannot be easily extended to other static analyses. By comparison, the techniques described herein provide for a framework that accommodates additional static analyses by simply defining lattice definition files for lattices corresponding to these analyses. The techniques thus improve security testing technology, and more particularly SAST technology.

Figure 4:
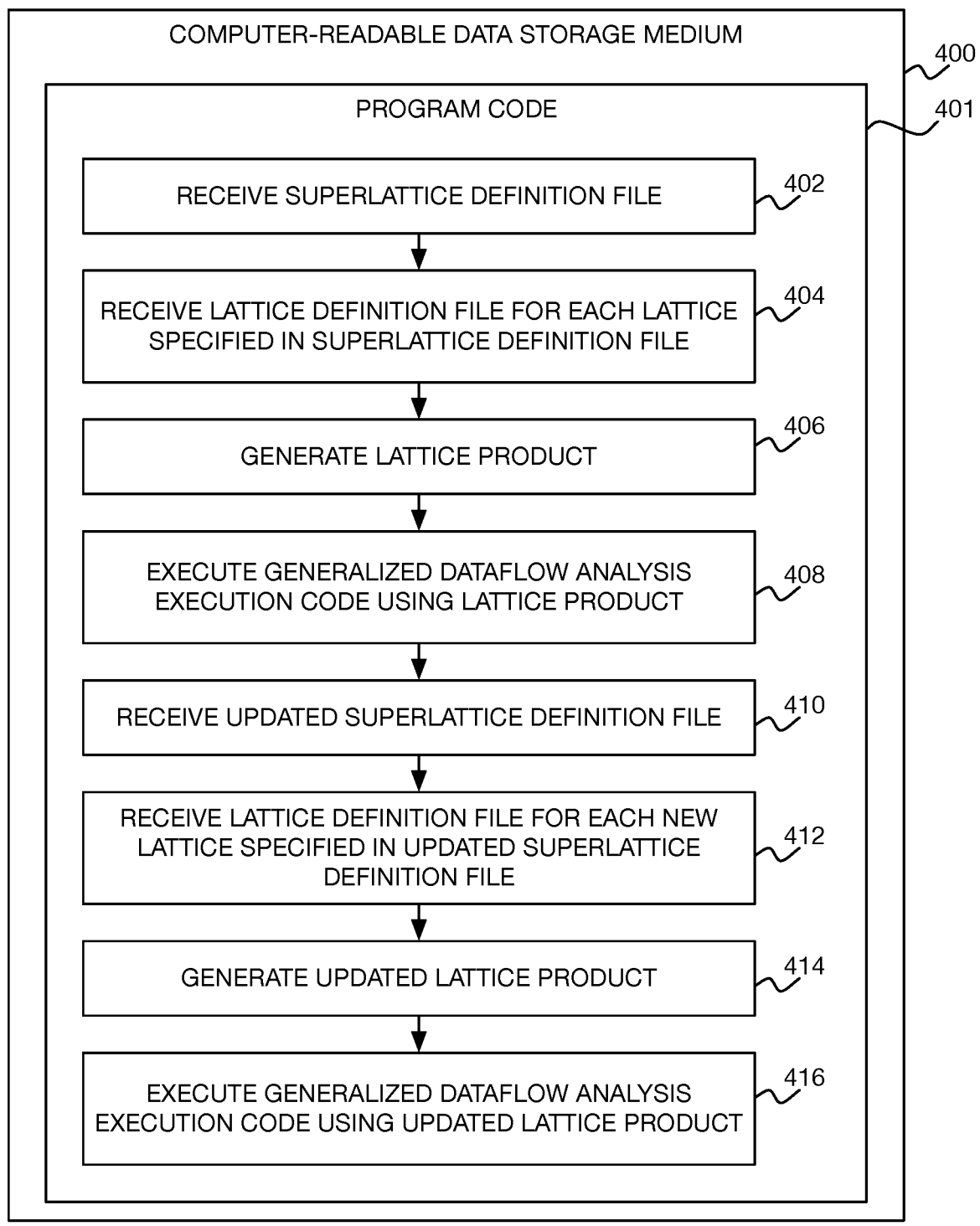
FIG. 4 is a diagram of an example non-transitory computer-readable data storage medium storing program code for using the same generalized dataflow analysis execution code to perform different SAST of source code by updating the superlattice definition file to specify different lattices.

FIG. 4 shows an example non-transitory computer-readable data storage medium 400 storing program code 401 for using the same generalized dataflow analysis execution code 310 to perform different SAST of source code 302. The program code 402 is executable by a processor to perform processing. The processing includes receiving a definition file 200 of a superlattice 201 corresponding to SAST of source code 302 (402). The superlattice 201 specifies a group 202 of lattices 102 respectively corresponding to static analyses 104 performable on the source code 302.

The processing includes, for each lattice 102 specified by the superlattice 201, receiving a corresponding definition file 100 (404). As has been noted, the definition file 100 for a lattice 102 specifies all possible lattice elements 106 of the lattice 102, and an operator 108 indicating how two lattice elements 106 of the lattice 102 are combined during the static analysis 104 to which the lattice 102 corresponds. The definition file 100 further specifies one of the possible lattice elements 106 as an initial value 110 for each variable at application of the generalized dataflow analysis executable code 310 in relation to the source code 302 (i.e., during evaluation of the superlattice 201). The definition file 100 specifies how different source code line types are processed with respect to the possible lattice elements 106 during application of the generalized dataflow analysis executable code 310 to the source code 302.

The processing includes generating a lattice product 306 of the lattices 102 specified by the superlattice 201, based on all the possible lattice elements 106 of each lattice 102 and the operator 108 of each lattice 102 (406). The processing includes then executing the generalized dataflow analysis executable code 310 on the source code 302 using the lattice product 306 to perform the SAST of the source code 310 (408). In this respect, an intermediate representation 304 of the source code 302 may be received, where the code 310 is performed on this intermediate representation 304.

In the example processing of FIG. 4, an updated definition file 200 of the superlattice 201 is received (410), in which the superlattice 201 specifies one or more new lattices 102 in addition to or in lieu of the lattices 102 that were previously specified in the definition file 200 (410). The processing includes receiving a definition file 100 for each new lattice 102 specified by the superlattice 201 (412), and generating an updated lattice product 306 of the lattices 102 currently specified by the superlattice 201 of the updated definition file 200, including the new lattices 102 (414). The processing includes then executing the generalized dataflow analysis executable code 310 on the source code 302 again, using the updated lattice product 306 (416).

FIG. 4 thus shows that the generalized dataflow analysis executable code 310 is not changed to account for new lattices 102 between application of the code 310 to the lattice product 306 resulting from the superlattice 201 of the definition file 200 received in (402) and application of the code 310 to the updated lattice product 306 resulting from the superlattice 201 of the updated definition file 200 received in (410). In the example, the superlattice definition file 200 just has to be updated to specify different lattices 102, thereby specifying different static analyses 104 that are to be performed as the SAST on the source code 302.

Figure 5:
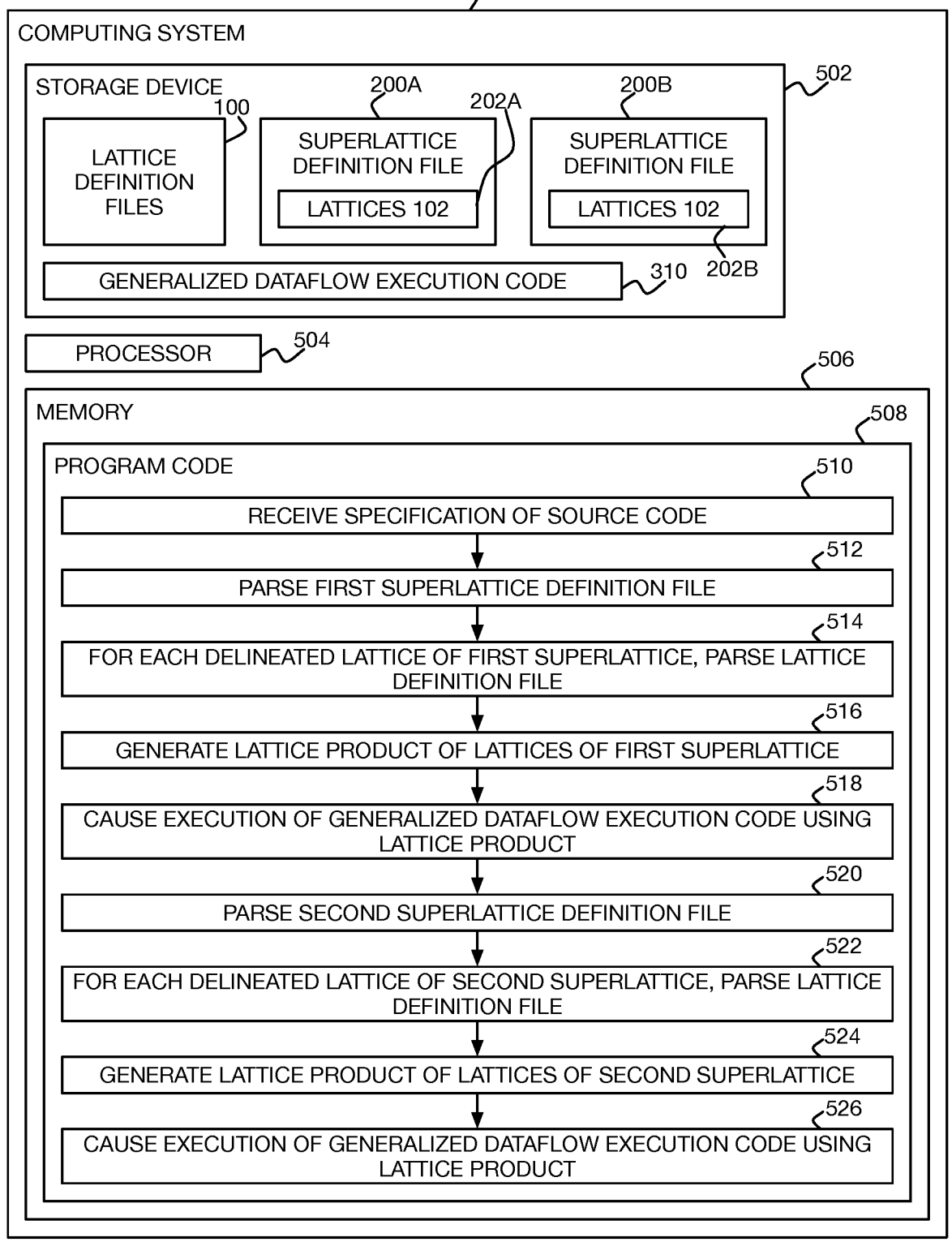
FIG. 5 is a diagram of an example computing system for using the same generalized dataflow analysis execution code to perform different SAST of source code corresponding to different superlattice definition files that specify different lattices.

FIG. 5 shows an example computing system 500 for using the same generalized dataflow analysis execution code 310 to perform different SAST of source code 302. The system 500 includes a storage device 502, which can also be referred to as storage hardware or a storage circuit, and which can include a hard disk drive, a solid-state drive, or another type of storage device. The storage device 502 stores lattice definition files 100 for lattices 102 corresponding to different static analyses 104. The storage device 502 stores a first superlattice definition file 200A of a first superlattice 201A specifying a first group 202A of the lattices 102, and a second superlattice definition file 200B of a second superlattice 201B specifying a second group 202B of the lattices 102 different than the first group 202A.

The system 500 further includes a processor 504, and a memory 506 storing program code 508 executable by the processor 504 to perform processing. The processing includes receiving specification of the source code 302 of which the SAST corresponding to each of the superlattices 201A and 201B is to be performed (510). The processing includes parsing the definition file 200A of the first superlattice 201A to delineate the lattices 102 specified by the superlattice 201A (512), and parsing the definition file 100 for each such lattice 102 to delineate all the possible elements 106 of the lattice 102 and the operator 108 of the lattice 102 (514), among other information. The processing includes generating a lattice product 306 of these delineated lattices 102 (516), and then causing execution of the generalized dataflow analysis execution code 310 on the source code 302 to perform the SAST corresponding to the first superlattice 201A (518).

As noted above, the lattice definition files 100 may be Java source code for their respective lattices 102, which upon compilation result in generation of Java objects corresponding to these lattices 102. Parsing the lattice definition files 100 in this respect can include compiling and/or executing the source code. The superlattice definition file 200A may be explicit, in that it specifies certain (but not necessarily all) of the lattices 102, or may be implicit, in that every lattice 102 that is defined (by corresponding source code) is considered to be specified.

The processing similarly includes parsing the definition file 200B of the second superlattice 201B to delineate the lattices 102 specified by the superlattice 201B (520), and parsing the definition file 100 for each such lattice 102 to delineate all the possible elements 106 of the lattice 102 and the operator 108 of the lattice 102 (522), among other information. The processing includes generating a lattice product 306 of these delineated lattices 102 (524), and then causing execution of the generalized dataflow analysis execution code 310 on the source code 302 to perform the SAST corresponding to the second superlattice 201B (526).

Figure 6:
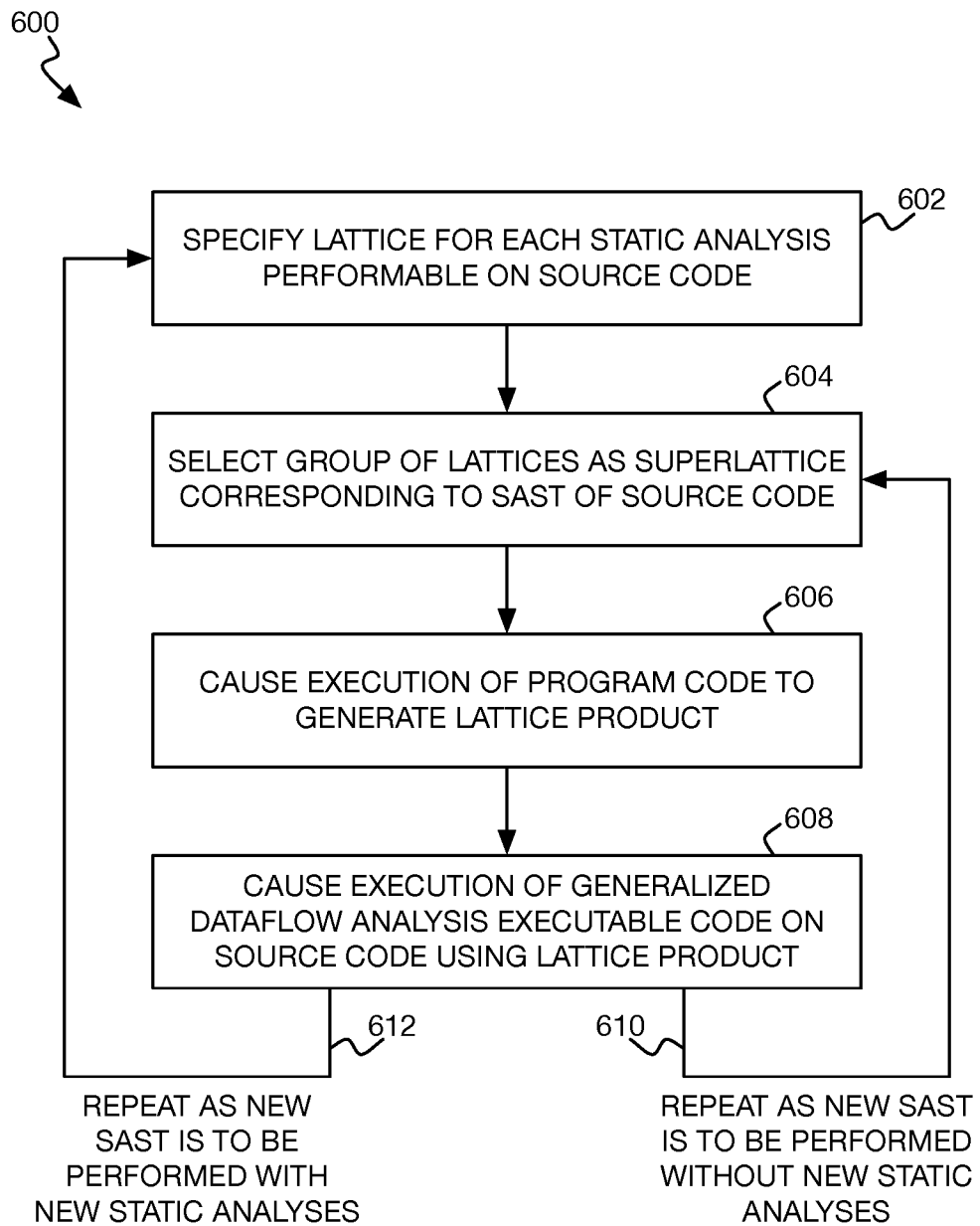
FIG. 6 is a flowchart of an example method for using the same generalized dataflow analysis execution code to perform different SAST of source code as lattices for new types of static analyses are specified and included within superlattices.

FIG. 6 shows an example method 600 for using the same generalized dataflow analysis execution code 310 to perform different SAST of source code 302. The method 600 includes, for a number of static analyses 104 performable on source code 302, respectively specifying lattices 102 (602). Each lattice 102 is specified (i.e., defined) by all possible lattice elements 106 of the lattice 102 and the operator 108 indicating how two lattice elements 106 are combined during the corresponding static analysis 104, among other information. The method 600 includes selecting, as a superlattice 201 corresponding to particular SAST of the source code 302, a group 202 of the lattices 102 (604), such that the static analysis 104 to which each lattice 102 of the group 202 corresponds is performed during the SAST.

The method 600 includes causing a processor to execute program code to generate a lattice product 306 of the lattices 102 of the group 202 selected as the superlattice 201 (606). The processor may be the processor 504, for instance, and the program code 508 may be a portion of the program code 508. The method 600 includes causing the processor to execute generalized dataflow analysis executable code 310 on the source code 302, using the lattice product 306, to perform the SAST on the source code 302 (608).

The method 600 can be repeated by proceeding back to (604) as new SAST is to be performed that does not include new static analyses 104 (610). That is, different groups 202 of the lattices 102 for the existing static analyses 104 can be specified as new superlattices 201. The method 600 can also be repeated by proceeding back to (602) as new SAST is to be performed that does include new static analyses 104 (612). That is, for such new static analyses 104, new lattices 102 are specified, which can then be included in a lattice group 202 specified by a superlattice 201.

Techniques have been described for generalized dataflow analysis for SAST of source code 302 of an application. The techniques specifically provide a framework in which different static analyses 104 are defined by corresponding lattices 102 within lattice definition files 100, such that a superlattice 201 specifying a group 202 of one or more of these lattices 102 can be defined within a superlattice definition file 200. The techniques thus provide for a way to specify static analyses 104 as mathematical lattices 102, and a way to specify SAST including selected of these static analyses 104 as a superlattice 201 of their corresponding lattices 102. Therefore, the SAST can be program on source code 302 by lattice evaluation—i.e., by simply evaluating the superlattice 201, which is a product of the specified lattices 102. Because lattice evaluation is not particular to any superlattice 201 or lattice 102, the techniques permit the same generalized data analysis execution code 310 to be used regardless of the SAST and the static analyses 104 that are performed.

We claim:

1. A non-transitory computer-readable data storage medium storing program code executable by a processor to perform processing comprising:
receiving a definition file of a superlattice corresponding to static application security testing (SAST) of source code, the superlattice specifying a plurality of lattices respectively corresponding to static analyses performable on the source code;
for each lattice specified by the superlattice, receiving a definition file specifying all possible lattice elements of the lattice and an operator indicating how two lattice elements of the lattice are combined during a static analysis to which the lattice corresponds;
generating a lattice product of the lattices specified by the superlattice, based on all the possible lattice elements of each lattice and the operator of each lattice indicating how two lattice elements are combined; and
executing generalized dataflow analysis executable code on the source code using the lattice product of the lattices to perform the SAST of the source code, including the static analyses respectively corresponding to the lattices.

2. The non-transitory computer-readable data storage medium of claim 1, wherein the processing further comprises:
in response to application of the generalized dataflow analysis executable code to the source code identifying a security vulnerability in the source code, performing a remedial action regarding the source code to resolve the security vulnerability.

3. The non-transitory computer-readable data storage medium of claim 1, wherein the generalized dataflow analysis executable code is not specific to any particular static analysis or analyses, and is operable on the lattice product of any group of lattices corresponding to different static analysis.

4. The non-transitory computer-readable data storage medium of claim 3, wherein the processing further comprises:
receiving an updated definition file of the superlattice in which the superlattice specifies one or more new lattices in addition to or in lieu of the lattices that were previously specified;
for each new lattice specified by the superlattice, receiving a definition file specifying all possible lattice elements of the new lattice and an operator indicating how two lattice elements of the new lattice are combined during the static analysis;
generating an updated lattice product of the lattices currently specified by the superlattice, including the new lattices; and
executing the generalized dataflow analysis executable code on the source code again, using the updated lattice product of the lattices,
wherein the generalized dataflow analysis executable code is not changed to account for the new lattices between application to the lattice product and application to the updated lattice product.

5. The non-transitory computer-readable data storage medium of claim 3, wherein the superlattice and each lattice specified by the superlattice are not particular to any source code and are source code independent.

6. The non-transitory computer-readable data storage medium of claim 1, wherein the definition file for each lattice further specifies:
an initial value at application of the generalized dataflow analysis executable code to the source code, the initial value being one of the possible lattice elements; and
how different source code line types are processed with respect to the possible lattice elements during application of the generalized dataflow analysis executable code to the source code.

7. The non-transitory computer-readable data storage medium of claim 1, wherein, for each lattice, the operator specified by the definition file is a lattice join operator or a lattice meet operator.

8. The non-transitory computer-readable data storage medium of claim 1, wherein the processing further comprises:
receiving an intermediate representation of the source code,
wherein the generalized dataflow analysis executable code is directly applied to the intermediate representation of the source code.

9. The non-transitory computer-readable data storage medium of claim 1, wherein the lattices specified by the superlattice comprise a plurality of propagation lattices including one or more propagation lattices that are selected from a group consisting of:
a constant propagation lattice corresponding to a static analysis of the source code to determine potential values of variables delineated in the source code;
a type propagation lattice corresponding to a static analysis of the source code to determine potential types of the variables delineated in the source code; and
a function pointer lattice corresponding to a static analysis of the source code to determine potential targets of virtual function calls delineated in the source code.

10. The non-transitory computer-readable data storage medium of claim 9, wherein the lattices specified by the superlattice further comprise a plurality of security vulnerability detection lattices including one or more security vulnerability detection lattices that are each selected from a group consisting of:
a taint analysis lattice corresponding to a static analysis of the source code to identify whether the variables delineated in the source code are tainted with security vulnerabilities;
a buffer analysis lattice corresponding to a static analysis of the source code to identify whether buffers delineated in the source code have buffer overflow or underflow vulnerabilities; and
a control flow analysis lattice corresponding to a static analysis of the source code to identify whether the source code reaches an impermissible state.

11. The non-transitory computer-readable data storage medium of claim 1, wherein the lattice product is a lattice having a plurality of lattice elements that each comprise a tuple of lattice elements from the plurality of lattices specified by the superlattice.

12. The non-transitory computer-readable data storage medium of claim 11,
wherein each lattice element of the lattice that is the lattice product comprises one of the possible lattice elements from each of the plurality of lattices specified by the superlattice,
and wherein a lattice operator of the lattice that is the lattice product specifies component-wise application of the operator of each of the plurality of lattices specified by the superlattice to respective components in the plurality of lattice elements of the superlattice.

13. A computing system comprising:
a storage device storing:
a plurality of definition files for a plurality of lattices respectively corresponding to static analyses performable on source code, each definition file specifying all possible lattice elements of a corresponding lattice and an operator indicating how two lattice elements of the corresponding lattice are combined during a static analysis of the corresponding lattice;
a definition file of a superlattice corresponding to static application security testing (SAST) of the source code, the superlattice specifying a group of the lattices;
generalized dataflow analysis execution code that performs lattice evaluation for the source code;
a processor; and
a memory storing program code executable by the processor to:
receive specification of the source code of which the SAST is to be performed;
parse the definition file of the superlattice to delineate the lattices specified by the superlattice;
for each lattice delineated by parsing the definition file of the superlattice, parse the definition file of the lattice to delineate all the possible elements of the corresponding lattice and the operator of the lattice;
generate a lattice product of the lattices that have been delineated, based on all the possible lattice elements of each lattice that have been delineated and the operator of each lattice that has been delineated; and
cause execution of the generalized dataflow analysis execution code on the source code of which the specification has been received, using the lattice product, to perform the SAST of the source code, including the static analyses respectively corresponding to the lattices of the group specified by the superlattice.

14. The computing system of claim 13, wherein the generalized dataflow analysis executable code is operable on the lattice product of any group of the lattices, and not just to the lattice product of the group specified by the superlattice in the definition file of the superlattice stored on the storage device.

15. The computing system of claim 14, wherein the definition file of the superlattice is a first definition file of a first superlattice specifying a first combination of the lattices,
wherein the storage device further stores a second definition file of a second superlattice corresponding to the SAST of the source code, the second superlattice specifying a second group of the lattices,
and wherein the program code is executable by the processor to further:
parse the second definition file to delineate the lattices of the second group specified by the second superlattice;
for each lattice delineated by parsing the second definition file of the second superlattice, parse the definition file of the lattice to delineate all the possible elements of the corresponding lattice and the operator of the lattice;
generate a lattice product of the lattices of the second group of the lattices that have been delineated, based on all the possible lattice elements of each lattice of the second group and the operator of each lattice of the second group; and cause execution of the generalized dataflow analysis execution code on the source code to perform the SAST of the source code, using the lattice product of the lattices of the second group of the lattices, including the static analyses respectively corresponding to the lattices of the second group of the lattices specified by the second superlattice.

16. The computing system of claim 14, wherein the superlattice and the lattices are not particular to any source code and are source code independent.

17. A method comprising:
for a plurality of static analyses performable on source code, respectively specifying a plurality of lattices, each lattice specified by all possible lattice elements of the lattice and an operator indicating how two lattice elements of the lattice are combined during a static analysis of the plurality of static analyses to which the lattice corresponds;
selecting, as a superlattice corresponding to static application security testing (SAST) of the source code, a group of the lattices, such that the static analysis of the plurality of static analyses to which each lattice of the group corresponds is performed during the SAST;
causing a processor to execute program code to generate a lattice product of the lattices of the group selected as the superlattice, based on all the possible lattice elements of each lattice of the group and the operator of each lattice of the group; and
causing the processor to execute generalized dataflow analysis executable code on the source code, using the lattice product, to perform the SAST on the source code, including the static analyses to which the lattices of the group respectively correspond.

18. The method of claim 17, wherein the generalized dataflow analysis executable code is operable on the lattice product of any group of the lattices, and not just to the lattice product of the group selected as the superlattice.

19. The method of claim 18, wherein the superlattice is a first superlattice, and the group of the lattices is a first group of the lattices,
and wherein the method further comprises:
selecting, as a second superlattice corresponding to the SAST of the source code, a second group of the lattices, such that the static analyses to which each lattice of the second group corresponds is performed during the SAST;
causing the processor to execute the program code to generate a lattice product of the lattices of the second group of the lattices selected as the second superlattice, based on all the possible lattice elements of each lattice of the second group and the operator of each lattice of the second group;
cause the processor to execute the generalized dataflow analysis executable code on the source code, using the lattice product of the lattices of the second group of the lattices, to perform the SAST on the source code, including the static analyses to which the lattices of the second group of the lattices respectively correspond.

20. The method of claim 17, wherein the superlattice and the lattices are not particular to any source code and are source code independent.

* * * * *